US011859521B2

(12) United States Patent
Rosenberger

(10) Patent No.: US 11,859,521 B2
(45) Date of Patent: Jan. 2, 2024

(54) MEASURING ROD, IN PARTICULAR OIL DIP-STICK, FOR AN INTERNAL COMBUSTION ENGINE, IN PARTICULAR OF A MOTOR VEHICLE, ARRANGEMENT OF SUCH A MEASURING ROD IN A GUIDE TUBE, AND MOTOR VEHICLE

(71) Applicant: Bayerische Motoren Werke Aktiengesellschaft, Munich (DE)

(72) Inventor: Maximilian Rosenberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 527 days.

(21) Appl. No.: 17/267,926

(22) PCT Filed: Aug. 12, 2019

(86) PCT No.: PCT/EP2019/071609
§ 371 (c)(1),
(2) Date: Feb. 11, 2021

(87) PCT Pub. No.: WO2020/064202
PCT Pub. Date: Apr. 2, 2020

(65) Prior Publication Data
US 2021/0246816 A1 Aug. 12, 2021

(30) Foreign Application Priority Data

Sep. 26, 2018 (DE) ..................... 10 2018 216 512.2

(51) Int. Cl.
*F01M 11/12* (2006.01)
*G01F 23/04* (2006.01)

(52) U.S. Cl.
CPC ............. *F01M 11/12* (2013.01); *G01F 23/04* (2013.01)

(58) Field of Classification Search
CPC ............................... F01M 11/12; G01F 23/04
(Continued)

(56) References Cited

U.S. PATENT DOCUMENTS 2,876,548 A * 3/1959 Banker .................... D01D 5/20
33/717
3,460,181 A * 8/1969 Denver ................. G01F 23/045
73/290 R (Continued)

FOREIGN PATENT DOCUMENTS

CN 101555816 A 10/2009
CN 201401204 Y 2/2010
(Continued)

OTHER PUBLICATIONS

Chinese-language Office Action issued in Chinese Application No. 201980048437.3 dated Dec. 3, 2021 with English translation (14 pages).
(Continued)

*Primary Examiner* — George B Bennett
(74) *Attorney, Agent, or Firm* — Crowell & Moring LLP

(57) ABSTRACT

A measuring rod for measuring a fill level of a lubricant in a reservoir of an internal combustion engine includes a rod element, at one end of which is arranged a measuring tongue which can be submerged into the lubricant and by which the fill level can be measured and can be detected visually. At least one sealing element is arranged on the measuring tongue, by way of which the measuring rod can be sealed in relation to a guide tube for guiding the measuring rod.

13 Claims, 3 Drawing Sheets

(58) Field of Classification Search
USPC .................................................. 33/722–731
See application file for complete search history.

(56) References Cited

U.S. PATENT DOCUMENTS

| | | | | |
|---|---|---|---|---|
| 3,594,906 | A * | 7/1971 | Kerfoot | G01F 23/04 33/717 |
| 3,703,038 | A * | 11/1972 | Smith | G01F 23/045 33/725 |
| 4,155,166 | A * | 5/1979 | Rochow | G01F 23/04 33/727 |
| 4,174,574 | A * | 11/1979 | Kirchweger | F02B 77/13 181/204 |
| 4,266,344 | A * | 5/1981 | Richardson | G01F 23/04 116/227 |
| 4,330,940 | A | 5/1982 | Leitgeb | |
| 4,649,746 | A * | 3/1987 | Snow | G01F 23/00 73/290 R |
| 4,881,486 | A * | 11/1989 | Willis | G01F 23/0046 116/227 |
| 4,942,669 | A * | 7/1990 | Schnedl | G01F 23/04 33/725 |
| 5,154,005 | A * | 10/1992 | Lalevee, Sr. | G01F 23/04 33/726 |
| 5,205,172 | A * | 4/1993 | Doak | G01F 23/04 340/622 |
| 5,241,753 | A * | 9/1993 | Lalevee, Sr. | G01F 23/04 33/726 |
| 5,613,303 | A * | 3/1997 | Kayano | G01F 23/04 33/722 |
| 6,314,808 | B1 * | 11/2001 | Williams | G01F 23/04 33/722 |
| 6,752,173 | B2 * | 6/2004 | Sundqvist | G01F 23/04 215/355 |
| 6,785,978 | B2 * | 9/2004 | Matsumoto | G01F 23/04 33/726 |
| 7,546,693 | B1 * | 6/2009 | Impellizeri | G01F 23/04 33/722 |
| 8,136,261 | B2 * | 3/2012 | Armistead | G01F 23/04 33/727 |
| 8,272,140 | B2 * | 9/2012 | Goldstein | A45D 40/267 401/122 |
| 11,396,976 | B1 * | 7/2022 | Bodary | G01F 23/04 |
| 2009/0151184 | A1 | 6/2009 | Impellizeri | |
| 2011/0061254 | A1 | 3/2011 | Armistead | |
| 2022/0340337 | A1 * | 10/2022 | Kulkarni | B60K 15/0406 |

FOREIGN PATENT DOCUMENTS

| | | |
|---|---|---|
| CN | 101776003 A | 7/2010 |
| CN | 102828796 A | 12/2012 |
| CN | 202789011 U | 3/2013 |
| CN | 103256096 A | 8/2013 |
| CN | 203594486 U | 5/2014 |
| CN | 106812567 A | 6/2017 |
| DE | 26 17 150 A1 | 10/1977 |
| DE | 88 04 818 U1 | 8/1989 |
| DE | 196 10 734 A1 | 10/1996 |
| DE | 197 26 294 A1 | 1/1998 |
| DE | 299 01 572 U1 | 9/1999 |
| DE | 103 154 13 A1 | 10/2004 |
| DE | 10 2005 033 660 A1 | 1/2007 |
| DE | 10 2005 053 813 B4 | 3/2017 |
| EP | 0 022 448 B1 | 7/1983 |
| FR | 1 076 803 A | 10/1954 |
| FR | 2 934 678 A1 | 2/2010 |
| WO | WO 03/054491 A2 | 7/2003 |

OTHER PUBLICATIONS

International Search Report (PCT/ISA/210) issued in PCT Application No. PCT/EP2019/071609 dated Nov. 12, 2019 with English translation (six (6) pages).

German-language Written Opinion (PCT/ISA/237) issued in PCT Application No. PCT/EP2019/071609 dated Nov. 12, 2019 (five (5) pages).

German-language Search Report issued in German Application No. 10 2018 216 512.2 dated Jul. 15, 2019 with partial English translation (11 pages).

Chinese-language Office Action issued in Chinese Application No. 201980048437.3 dated May 9, 2022 with English translation (15 pages).

* cited by examiner

MEASURING ROD, IN PARTICULAR OIL DIP-STICK, FOR AN INTERNAL COMBUSTION ENGINE, IN PARTICULAR OF A MOTOR VEHICLE, ARRANGEMENT OF SUCH A MEASURING ROD IN A GUIDE TUBE, AND MOTOR VEHICLE

BACKGROUND AND SUMMARY OF THE INVENTION

The invention relates to a measuring rod for an internal combustion engine. The invention furthermore relates to an arrangement of such a measuring rod in a guide tube. The invention furthermore relates to a motor vehicle, in particular a car.

WO 03/054491 A2 discloses a measuring rod for immersion into a container which contains a medium, in particular oil, with a rod-shaped element, at one end of which a handle piece and at the other end of which a measuring tongue is arranged. It is provided here that at least one measuring device for determining the state of the medium is provided on the measuring tongue and at least one display device which displays the values determined by the measuring device is provided on the handle piece.

A guide tube for an oil dip-stick of an internal combustion engine can be inferred as known from DE 10 2005 033 660 A1. The oil dip-stick can be inserted into the guide tube and can be removed again to read a wetting mark generated by the oil level.

DE 10 2005 053 813 B4 furthermore discloses a device for measuring the engine oil level in the oil pan of an internal combustion engine, with an oil dipstick.

The object of the present invention is to create a measuring rod, an arrangement of such a measuring rod in a guide tube and a motor vehicle so that particularly simple leakage testing and particularly advantageous readability can be realized, wherein the costs can simultaneously be kept particularly low.

This object is achieved according to the invention by a measuring rod, by an arrangement of such a measuring rod in a guide tube, and by a motor vehicle having the measuring rod, in accordance with the independent claims. Advantageous configurations of the invention are the subject matter of the dependent claims.

A first aspect of the invention relates to a measuring rod for measuring a fill level of a lubricant in a reservoir of an internal combustion engine, in particular for a motor vehicle such as, for example, a car. The lubricant is preferably a lubricating oil which is simply also referred to as oil. The measuring rod is then, for example, also referred to as an oil dip-stick. For example, the lubricant is a liquid, wherein the lubricant collects or can collect in the reservoir. The reservoir is preferably a lubricant pan which is also referred to as an oil pan and by means of which the lubricant can be gathered and collected in particular after lubrication points of the internal combustion engine have been lubricated by means of the lubricant.

The measuring rod has a rod element, at one end of which a measuring tongue which can be immersed into the lubricant is arranged. The fill level can be measured and visually determined by means of the measuring tongue in particular in such a manner that a wetting of the measuring tongue with the lubricant resulting from an immersing of the measuring tongue into the lubricant accommodated in the reservoir can be visually determined. In this case, for example, a person can with his or her eyes visually perceive the wetting of the measuring tongue with the lubricant, i.e. read it from the measuring tongue. In other words, for example, the fill level is measured by means of the measuring rod in such a manner that the measuring tongue is immersed at least partially into the lubricant accommodated in the reservoir. This leads to a wetting of the measuring tongue with the lubricant. The above-mentioned person can read this wetting from the measuring tongue, as a result of which the person can deduce the fill level or determine the fill level.

In order to thus realize particularly simple leakage testing and particularly advantageous readability of the measuring tongue or the wetting of the measuring tongue and at the same time be able to keep the costs of the measuring rod and thus of the internal combustion engine particularly low overall, it is provided according to the invention that the measuring rod has at least one or precisely one seal element arranged on the measuring tongue, by means of which seal element the measuring rod is to be sealed off from a guide tube for guiding the measuring rod, i.e. can be sealed off. The guide tube is used to guide the measuring tongue in the direction of the reservoir or to the reservoir if the measuring rod is pushed into the guide tube and in particular is pushed through the guide tube. In this case, the preferably inherently rigid measuring tongue and/or, for example, the preferably inherently rigid rod element come/comes in contact with the guide tube, in particular with an inner circumferential shell surface of the guide tube. As a result of this, for example, the rod-shaped rod element is deformed, in particular elastically, as a result of which the measuring tongue is guided in a targeted manner to the reservoir. The above-mentioned person must thus, for example, simply push the measuring rod through the guide tube, as result of which reaches the reservoir due to the fact that the measuring tongue or the rod element is guided by means of the guide tube. Thereupon, the person can pull the measuring rod out of the guide tube and as a result read the wetting of the measuring tongue. In the state of the measuring rod arranged in the guide tube, the measuring tongue is sealed off via the seal element from the guide tube, in particular from its inner circumferential shell surface, in particular at at least or precisely one sealing point.

The guide tube has for its part a first, reservoir-side end and a second end opposite or facing away from the first end, at which second end a handle piece of the measuring rod is arranged, for example, in the above-mentioned state or the handle piece adjoins the second end of the guide tube in the above-mentioned state. At the first end, the guide tube opens into the reservoir so that, for example, the measuring tongue at the first end of the guide tube protrudes at least partially out of the guide tube. As a result of this, the measuring tongue can be immersed at least partially into the lubricant. Since the measuring tongue and not the handle piece is sealed off from the guide tube, in particular from the inner circumferential shell surface of the guide tube, by means of the seal element, the above-mentioned sealing point at which the measuring tongue is sealed off from the guide tube by means of the seal element, in particular from the inner circumferential shell surface of the guide tube, lies at the first end of the guide tube or significantly closer to the first end of the guide tube than to the second end of the guide tube. Since the sealing point is impervious to the lubricant from the reservoir, for example, a longitudinal region of the guide tube extending from the sealing point continuously or without interruption up to the second end is a dry region or a dry chamber into which no lubricant can travel from the reservoir. Since the sealing point is arranged at the first end or closer to the first end than to the second end of the guide tube, the dry chamber or the dry region extends at least across most of the length, running from the first end to the second end or vice versa, of the guide tube or across the entire length of the guide tube. As a result of this, particularly simple leakage testing and particularly advantageous readability of the wetting of the measuring tongue can be ensured. Moreover, for example, a sealing off of the handle piece from the guide tube can be avoided so that the costs of the measuring rod or the internal combustion engine can be kept to a particularly low level overall.

The invention is based in particular on the following findings: a sealing off of the reservoir which is arranged in an oil chamber or which forms an oil chamber or a sealing off of the oil chamber itself is conventionally performed via three sealing points connected to the measuring rod and the guide tube. At a first of the three sealing points, a seal formed, for example, as an O-ring is normally provided between the handle piece also referred to in short as a handle and the guide tube so that the handle is sealed off from the guide tube by means of the O-ring. The measuring rod can, for example, be pushed so long into and through the guide tube until the measuring rod reaches an end position. As a result of this, the state described above is formed. In the end position, at least a sub-region of the handle is received in the guide tube, in particular is pushed into the guide tube, wherein the above-mentioned O-ring is arranged in the sub-region. In this case, the guide tube also forms a guide channel also referred to as an interior of the guide tube, along or by means of which the measuring rod is to be guided or is guided if the measuring rod is pushed through the guide tube. By means of the O-ring, the interior of the guide tube can be sealed off from its immediate surroundings at the first sealing point.

A second of the three sealing points is an interface between the, for example, mounted guide tube and the reservoir formed as a lubricant pan or oil pan. The lubricant pan and the guide tube are, for example, two components which are formed separately from one another and connected to one another and which are sealed off from one another at a second sealing point by means of at least one second seal. The third of the three sealing points is the guide tube or a material or substance from which the guide tube is produced, itself. In the course of a production of the internal combustion engine, these three sealing points are conventionally tested in terms of their respective imperviousness. It must be ensured that there are no leaks in the guide tube itself in terms of the guide tube or its material itself.

In order to test, for example, the first sealing point and the second sealing point for their respective imperviousness, the measuring rod or a structural element which represents and thus simulates the measuring rod is arranged in the guide tube, and, for example, a manufacturer of the guide tube and/or the measuring rod must provide a device by means of which the second sealing point is simulated since the lubricant pan itself is not necessarily available to the manufacturer of the guide tube. In order to check the imperviousness of the sealing points, the in particular complete interior of the guide tube is then pressurized to carry out a pressure test, i.e. acted upon with a pressure of, for example, 2 bar or 3 bar, in particular in a state in which the handle is pushed in, i.e. in which the measuring rod is located in its end position. In particular a complete inner region of the interior extending from the first end of the guide tube continuously or without interruption up to the first sealing point is pressurized to carry out a pressure test, i.e. acted upon with a pressure, since conventionally the measuring rod is not sealed off from the guide tube, in particular the measuring rod is not sealed off from the guide tube, in particular from its inner circumferential shell surface, via the measuring tongue, but rather exclusively via the handle. The above-mentioned pressure with which the interior is pressurized to carry out a pressure test is, for example, a differential pressure of 2 bar so that the interior is pressurized to carry out a pressure test, for example, with an absolute pressure of 3 bar. If a leak of, for example, 5 milliliters per minute occurs at at least one sealing point, the imperviousness is only insufficient. An installed measuring rod with a guide tube thus offers three potential paths for a lubricant leak since a leak can occur at the respective sealing point. In order to avoid an excessive leak at the respective sealing point, a high and thus time-consuming and costly outlay must conventionally be made. The measuring rod according to the invention makes it possible to simplify the leakage testing described above, to be able to easily read the wetting of the measuring tongue and to reduce the costs.

Since the measuring rod is to be sealed off or is sealed off from the guide tube not only or preferably not via the handle, but rather via the measuring tongue, for example, no lubricant can travel from the reservoir into a region of the guide tube arranged outside the reservoir since, for example, the sealing point at which the measuring tongue is sealed off from the guide tube by means of the seal element is arranged in the reservoir. As a result, the guide tube can be produced easily and at low cost and be installed or mounted. Since the sealing point is arranged at the lower first end or in the vicinity of the lower first end of the guide tube, at least the majority of the guide tube is no longer exposed to the oil depositions which occur during operation of the internal combustion engine so that at least the majority of the guide tube remains dry. As a result of this, leakage testing can be configured to be significantly simpler than previously in particular in the case of the above-mentioned method. Moreover, as a result of the thus generated dry guide tube, an undesirable stripping of oil no longer occurs between the inner circumferential shell surface of the guide tube and the measuring tongue if the measuring rod is pulled out of the guide tube so that the measuring tongue or its wetting can be read visually with particular ease.

The measuring rod according to the invention makes it possible that the guide tube no longer has to be formed as a drawn tube, but rather the guide tube can be formed, for example, as a welded tube since one hundred percent wall imperviousness of the guide tube is no longer necessary, for example, as a result of the sealing off according to the invention of the measuring tongue from the guide tube.

The guide tube is fastened, for example, via at least one or several holders to at least one or several other structural elements of the motor vehicle. A respective connecting point, at which the respective holder is connected to the guide tube, in particular on the outer circumference, also does not have to have one hundred percent imperviousness any more since no lubricant can travel any more from the reservoir to the respective connecting point. As a result of this, the respective holder can be connected to the guide tube in a particularly simple, time-saving and low cost manner so that the guide tube can be installed or mounted in a particularly simple and low cost manner. In order to be able to seal off the measuring tongue and thus the measuring rod particularly advantageously and securely from the guide tube, it is provided in one advantageous configuration of the invention that the measuring tongue has a groove in which the seal element can be received or is received at least partially. The groove circumferential direction of the measuring tongue preferably extends completely circumferentially or circumferentially without interruptions.

A further embodiment is characterized in that the seal element is a structural element formed separately from the measuring tongue and fastened to the measuring tongue. As a result of this, the measuring rod can be sealed off particularly securely from the guide tube.

In order to realize a particularly advantageous sealing action, it is provided in a further configuration of the invention that the seal element is formed from rubber.

In order to be able to realize a particularly advantageous readability of the measuring tongue or its wetting, it is provided in the case of one embodiment of the invention that the measuring tongue and the rod element are formed as components which are formed separately from one another and connected to one another. For example, the measuring tongue is thus fastened to or arranged on one end of the rod element. The rod element is a rod-shaped structural element or element which thus has a first extent or a first length along a first direction. The first direction runs, for example, perpendicular to a plane in which, for example, a cross section of the rod element is arranged, wherein the rod element in the plane has two further extents or lengths which run perpendicular to one another and which are significantly smaller than the first length.

In order to be able to read the measuring tongue particularly easily and advantageously, the measuring tongue is formed, for example, from a plastic.

A second aspect of the invention relates to an arrangement of a measuring rod formed for measuring a fill level of a lubricant in a reservoir of an internal combustion engine, in particular of a measuring rod according to the invention, in a guide tube. In the case of the arrangement, the measuring rod is received at least partially, in particular at least primarily, in the guide tube. The measuring rod has a rod element and a measuring tongue which is arranged at one end thereof and can be immersed or is immersed into the lubricant, by means of which measuring tongue the fill level is to be measured and can be visually determined.

In order to be able to realize particularly easy leakage testing and particularly advantageous readability in a low cost manner, in the case of the second aspect of the invention, at least one seal element arranged on the measuring tongue is provided by means of which the measuring rod is sealed off from the guide tube for guiding the measuring rod.

Advantages and advantageous configurations of the first aspect of the invention are to be regarded as advantages and advantageous configurations of the second aspect of the invention and vice versa.

In order to be able to keep the costs particularly low, it is preferably provided that a first sub-region of the measuring tongue protrudes out of the guide tube and is thus arranged outside the guide tube and preferably in the reservoir or in a lubricant chamber also referred to as an oil chamber. A second sub-region of the measuring tongue adjoining the first sub-region is received in the guide tube, wherein the sub-regions are preferably formed in one piece with one another. In this case, the seal element is arranged in the second sub-region, wherein the second sub-region is preferably arranged in the reservoir.

It has been shown to be particularly advantageous if the measuring rod is sealed off from the guide tube exclusively by means of the seal element so that no further sealing point or no further sealing off is provided. As a result of this, the costs can be kept particularly low.

A third aspect relates to a motor vehicle preferably formed as a motor car, in particular as a car, which has a measuring rod according to the invention according to the first aspect of the invention and/or an arrangement according to the invention according to the second aspect of the invention. Advantages and advantageous configurations of the first aspect and the second aspect of the invention are to be regarded as advantages and advantageous configurations of the third aspect of the invention and vice versa.

Further details will become apparent from the following description of one preferred exemplary embodiment with the associated drawings.

BRIEF DESCRIPTION OF THE DRAWINGS

Identical and functionally identical elements are provided with identical reference numbers in the FIGS.

DETAILED DESCRIPTION OF THE DRAWINGS

Figure 1:
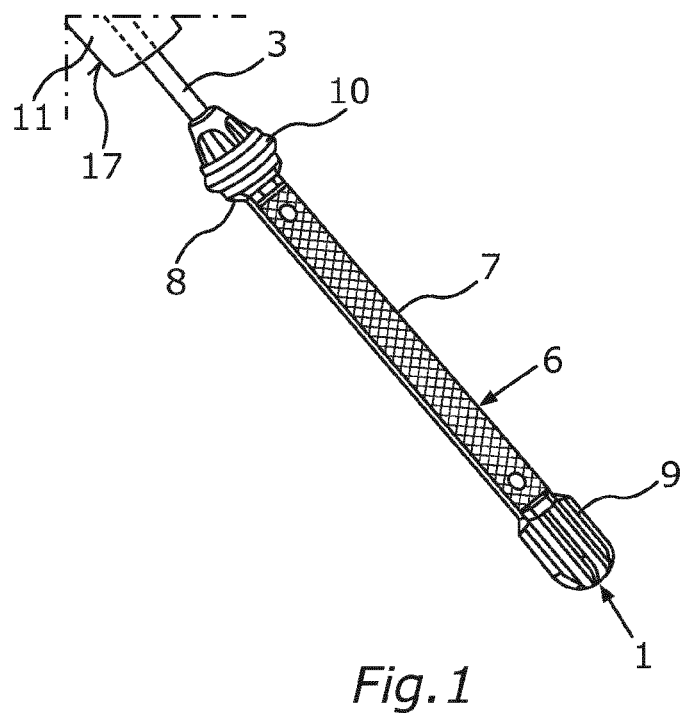
FIG. 1 shows in part a schematic perspective view of a measuring rod according to an embodiment of the invention.

FIG. 1 shows in part, in a schematic perspective view, a measuring rod 1 for measuring a fill level of a lubricant in a reservoir 2 (FIG. 4) of an internal combustion engine for a motor vehicle. The motor vehicle formed preferably as a motor car, in particular as a car, can be driven by means of the internal combustion engine also referred to in short as an engine or combustion engine. The lubricant can be an oil which is also referred to as lubricating oil. For example, reservoir 2 is thus formed as an oil pan. The internal combustion engine is lubricated at respective lubrication points by means of the oil. For this purpose, the lubrication points are supplied with the oil. Once the lubrication points have been supplied with the oil and lubricated by means of the oil, the oil can flow from the lubrication points to reservoir 2 and is gathered and collected in the reservoir or by means of reservoir 2. As a result of this, for example, the lubricant in reservoir 2 forms an oil sump also referred to as a sump.

Figure 5:
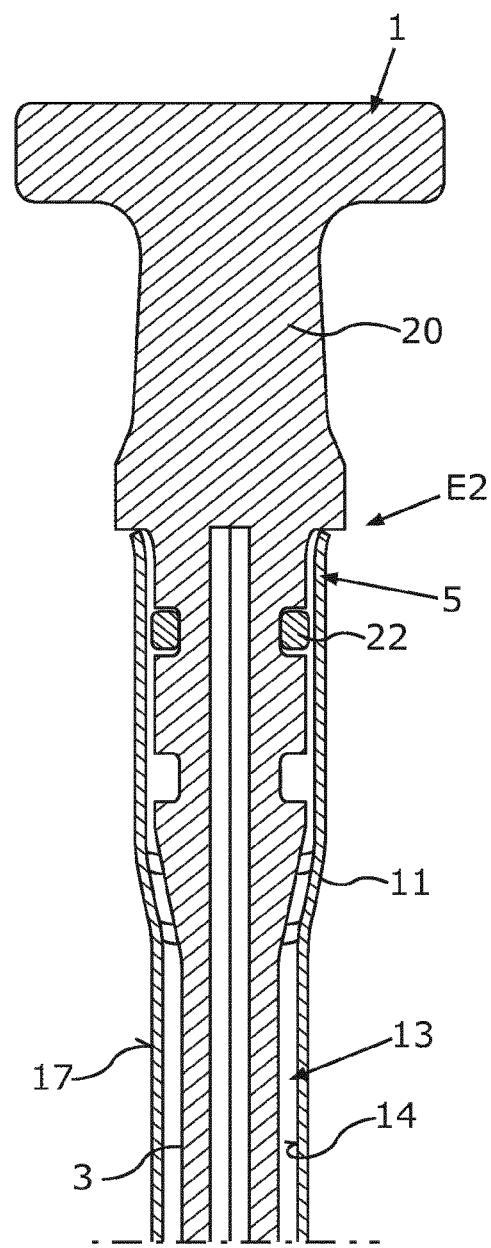
FIG. 5 shows in part a further schematic and sectional side view of the arrangement.

Measuring rod 1 can thus be used to measure a fill level and thus a quantity of oil accommodated in reservoir 2. To this end, measuring rod 1 has a rod element 3 which is apparent in part in FIG. 1, is formed, for example, from a metallic material and has a longitudinal extent. It is apparent when viewed together with FIG. 2 that rod element 3 has a reservoir-side first end 4 and a second end 5 opposite first end 4 (FIG. 5). A measuring tongue 6 of measuring rod 1 is arranged at first end 4, in particular fastened to rod element 3. Rod element 3 and measuring tongue 6 are structural elements which are, for example, already formed by one another and connected to one another, wherein measuring tongue 6 is formed, for example, from a plastic. Rod element 3 is, for example, also referred to as a braid. Measuring tongue 6 has, for example, a measuring region 7 and wiper beads 8 and 9 adjoining measuring region 7 on both sides in the longitudinal direction of extent of measuring tongue 6. For example, measuring tongue 6 is formed in one piece so that, for example, wiper beads 8 and 9 are formed in one piece with one another and in one piece with measuring region 7.

Measuring tongue 6 can be immersed at least partially into the sump and thus into the oil. As a result of this, measuring tongue 6 is at least partially wetted with the oil. Overall, measuring tongue 6, in particular measuring region 7, is wetted with the oil as a function of the current fill level of the oil in reservoir 2. The larger, for example, the part of measuring tongue 6 which is wetted with the oil during immersion of measuring tongue 6 into the oil accommodated in reservoir 2, the greater or higher the fill level in reservoir 2. For example, a person can visually determine the wetting of measuring tongue 6 and thus read it from measuring tongue 6 so that the person can measure and visually determine the fill level. The person can thus measure and visually determine the fill level by means of measuring tongue 6.

In order to be able to realize particularly simple leakage testing and particularly advantageous readability of measuring tongue 6 and be able to keep the costs particularly low, measuring rod 1 has at least or precisely one seal element 10 which is arranged on measuring tongue 6 and formed, for example, as an O-ring and by means of which measuring rod 1 is to be sealed off or is sealed off from a guide tube 11 which can be seen partially in FIG. 1 for guiding measuring rod 1.

Figure 2:
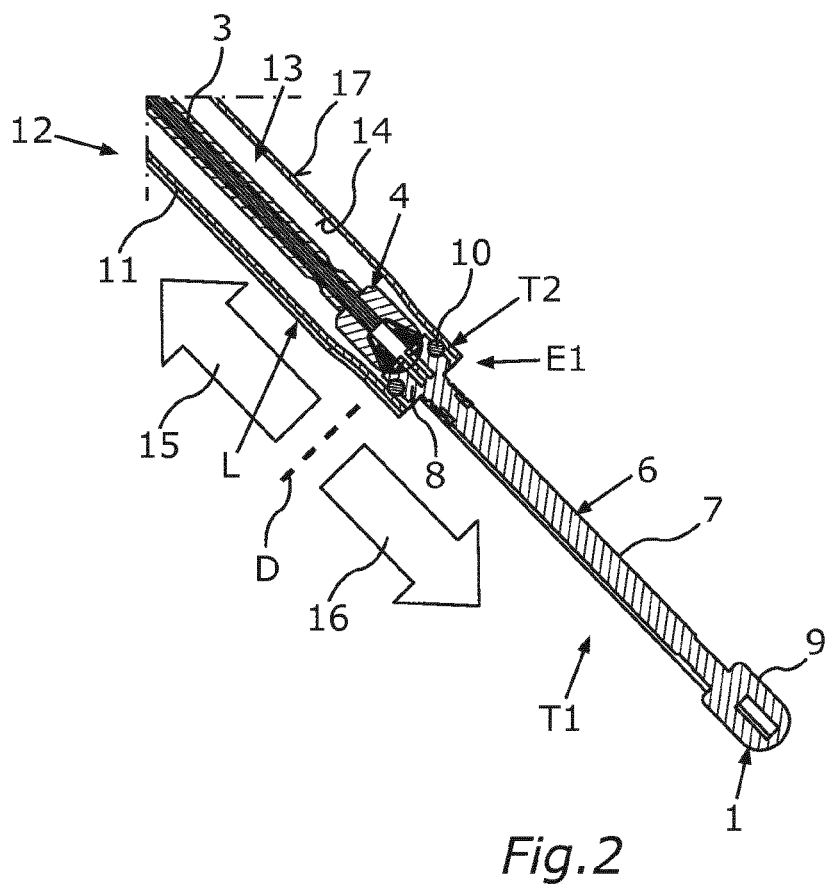
FIG. 2 shows in part a schematic and sectional side view of an arrangement according to an embodiment of the invention of the measuring rod in a guide tube.
Figure 3:
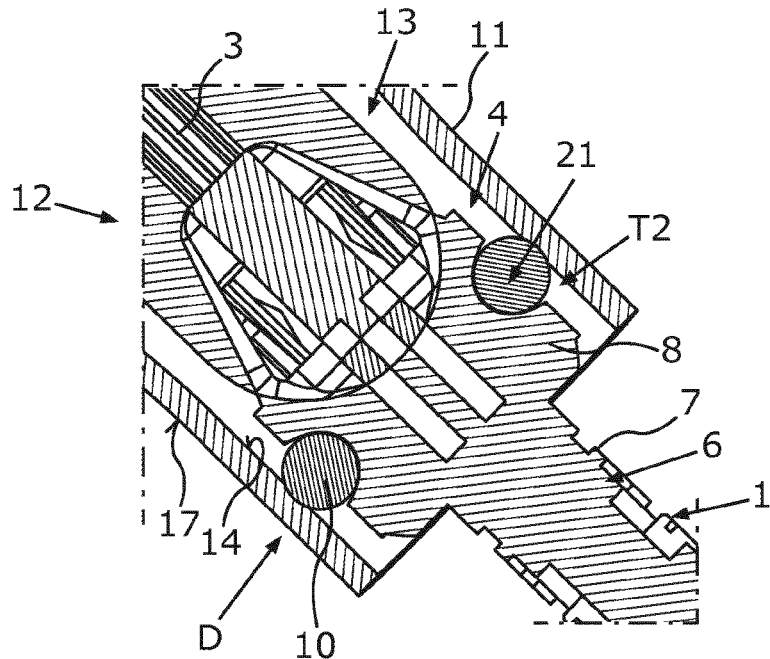
FIG. 3 shows in part a further schematic and sectional side view of the arrangement.

FIGS. 2, 3 and 5 show an arrangement 12 of measuring rod 1 in guide tube 11. In the case of arrangement 12, measuring rod 1 is received in such a manner in guide tube 11 and pushed into guide tube 11 that a handle element 20 of measuring rod 1 provided on second end 5 and also referred to in short as a handle or handle piece is pushed partially into guide tube 11 and is thus received partially in guide tube 11 and is arranged partially outside guide tube 11 since handle element 20 protrudes out of guide tube 11. Measuring rod 1 can be handled by the above-mentioned person via handle element 20. To this end, the person grips or grips around handle element 20. The person can handle measuring rod 1 via handle element 20 in such a manner that the person pushes measuring rod 1 into guide tube 11 and can push it through guide tube 11 in particular until measuring rod 1 comes into supporting bearing with guide tube 11, in particular via handle element 20. As is apparent from FIG. 2, a first sub-region T1 of measuring tongue 6 then protrudes out of guide tube 11 and a second sub-region T2 of measuring tongue 6 adjoining sub-region T1 is accommodated within guide tube 11 and thereby in a guide channel 13 of guide tube 11 delimited by guide tube 11. In this case, seal element 10 is arranged in second sub-region T2 so that second sub-region T2 is sealed off from guide tube 11, in particular from an inner circumferential shell surface 14 of guide tube 11 delimiting guide channel 13, by means of seal element 10 or via seal element 10. In particular, measuring tongue 6 is sealed off from a longitudinal region L of guide tube 11 also referred to as a sub-region by means of seal element 10, wherein longitudinal region L is not arranged outside reservoir 2, but rather still in reservoir 2 and thus in a lubricant chamber also referred to as an oil chamber.

It is particularly apparent from a combined view of FIGS. 2 and 5 that measuring tongue 6 is sealed off from guide tube 11, in particular from longitudinal region L, by means of seal element 10 at a sealing point D. Guide tube 11 has itself a reservoir-side first end E1 and a second end E2, opposite first end E1, and on the handle element side. It is apparent from FIG. 4 that guide tube 11 is connected to reservoir 2, wherein, for example, at least longitudinal region L is arranged in reservoir 2. While, for example, first end E1 is thus received in reservoir 2, second end E2 is arranged outside reservoir 2. Sealing point D is arranged at end E1 or in the vicinity of end E1 and significantly closer to end E1 than to end E2. For example, oil which is, for example, stirred up and thus penetrates from reservoir 2 into guide channel 13 can thus not travel to end E2, but rather only to sealing point D since sealing point D is impervious to the oil from the reservoir 2. Since longitudinal region L and thus sealing point D are still arranged in reservoir 2, one hundred percent imperviousness of guide tube 11 is not necessary since oil from reservoir 2 cannot travel to this leak, for example, when guide tube 11 itself has a leak which is arranged outside reservoir 2. If, for example, a leak of guide tube 11 is arranged in longitudinal region L and thereby between end E1 and sealing point D, so that, for example, oil can travel from reservoir 2 to this leak, this is not at all critical since oil which escapes from guide tube 11 at the leak travels back into reservoir 2.

In FIG. 2, an arrow 15 illustrates a dry chamber or dry region of guide channel 13, wherein the dry region of guide channel 13 extends from sealing point D up to end E2. No oil can travel into this dry region from reservoir 2 since oil can only travel from reservoir 2 up to sealing point D in guide channel 13. Moreover, in FIG. 2, an arrow 16 illustrates the oil chamber or a region into which oil can travel from reservoir 2. Seal element 10 formed, for example, as an O-ring and arranged on measuring tongue 6 seals off measuring tongue 6 from inner circumferential shell surface 14, as a result of which the oil chamber illustrated by arrow 16 is separated off with respect to the dry region. The dry region is in this case entire guide channel 13 or its entire volume with the exception of a small part which extends from sealing point D up to end E1. Neither oil nor oil mist travels from reservoir 2 into the dry region.

Figure 4:
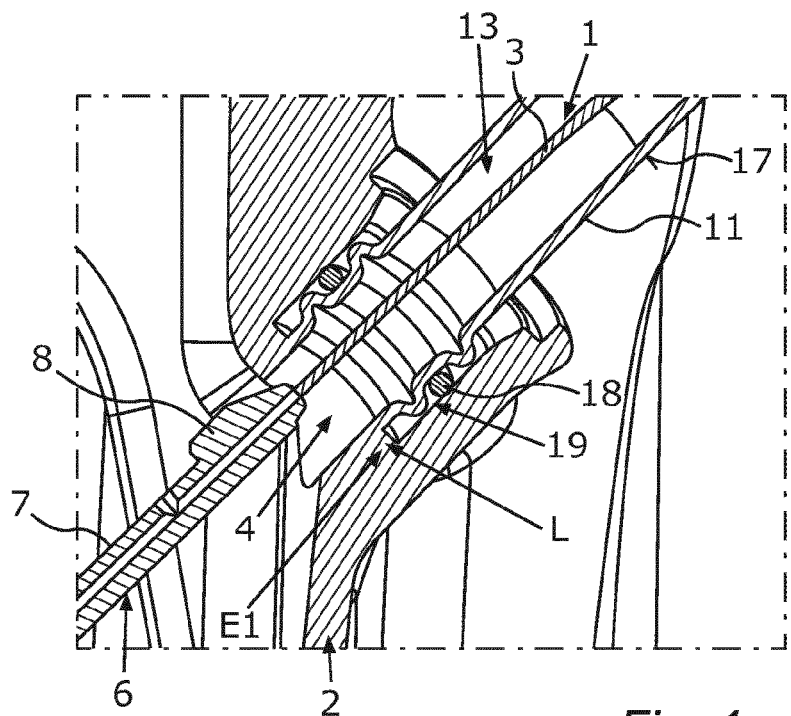
FIG. 4 shows in part a schematic and sectional side view of a reservoir formed as an oil pan and of a guide tube.

It is apparent from FIG. 4 that, for example, guide tube 11, in particular its outer circumferential shell surface 17 facing away from inner circumferential shell surface 14, is sealed off from reservoir 2 by means of a further seal element 18 formed in particular as an O-ring. For this purpose, seal element 18 is arranged at least partially in a groove 19 of guide tube 11, wherein groove 19 faces away from guide channel 13. Groove 19 is represented, for example, by a rolling up of guide tube 11, wherein seal element 18 is arranged or sits directly on outer circumferential shell surface 17. While, for example, seal element 10 prevents oil from flowing out of reservoir 2 into guide channel 13 between measuring rod 1 and guide tube 11, seal element 18 prevents oil from flowing through out of reservoir 2 between guide tube 11 and reservoir 2 itself.

As a result of this, particularly advantageous imperviousness can be realized.

FIG. 3 shows arrangement 12, in the case of which measuring rod 1 is located in its end position. In the end position, handle element 20 is pushed in, in particular completely, so that measuring rod 1 is pushed as far as possible into guide tube 11 and through guide tube 11. A further pushing in of measuring rod 1 into guide tube 11 is avoided by handle element 20 since handle element 20 is located in the end position with supporting bearing against guide tube 11.

It is particularly easily apparent from FIG. 3 that measuring tongue 6 has, in particular in sub-region T2, a groove 21 in which seal element 10 is received partially, in particularly exclusively. Seal element 10 is partially arranged in groove 21 and partially outside groove 21 so that seal element 10 is supported in the case of arrangement 12 and in the end position on one hand on measuring tongue 6 and on the other hand on guide tube 11.

Seal element 10 and/or seal element 18 are preferably formed from a rubber.

It is apparent from FIG. 5 that it is in principle possible to seal off handle element 20 by means of a further, third seal element 22 from guide tube 11, in particular from its inner circumferential shell surface 14. It has, however, been shown to be particularly advantageous if measuring rod 1 is sealed off exclusively by means of seal element 10 from guide tube 11, as a result of which the number of parts and thus costs can be kept particularly low. In other words, it is preferably provided that the sealing, which is illustrated in FIG. 5 and is performed via seal element 22, of measuring rod 1 from guide tube 11 is dispensed with.

LIST OF REFERENCE NUMBERS

1 Measuring rod
2 Reservoir
3 Rod element
4 First end
5 Second end
6 Measuring tongue
7 Measuring region
8 Wiper bead
9 Wiper bead
10 Seal element
11 Guide tube
12 Arrangement
13 Guide channel
14 Inner circumferential shell surface
15 Arrow
16 Arrow
17 Outer circumferential shell surface
18 Seal element
19 Groove
20 Handle element
21 Groove
22 Seal element
D Sealing point
L Longitudinal region
E1, E2 End
T1 First sub-region
T2 Second sub-region

What is claimed is:

1. A measuring rod for measuring a fill level of a lubricant in a reservoir of an internal combustion engine, comprising:
    a rod element, at one end of which a measuring tongue which is immersible into the lubricant is arranged, by way of which measuring tongue the fill level is to be measured and is visually determinable; and
    at least one seal element which is arranged on the measuring tongue and by which the measuring rod is to be sealed off from a guide tube for guiding the measuring rod.

2. The measuring rod according to claim 1, wherein the measuring tongue has a groove in which the seal element is at least partially received.

3. The measuring rod according to claim 1, wherein the seal element is a structural element formed separately from the measuring tongue and fastened to the measuring tongue.

4. The measuring rod according to claim 1, wherein the seal element is a rubber seal element.

5. The measuring rod according to claim 1, wherein the measuring tongue and the rod element are components formed separately from one another and connected to one another.

6. The measuring rod according to claim 1, wherein the measuring tongue is a plastic measuring tongue.

7. The measuring rod according to claim 4, wherein the measuring tongue is a plastic measuring tongue.

8. An arrangement, comprising:
    a measuring rod for measuring a fill level of a lubricant in a reservoir of an internal combustion engine;
    a guide tube for guiding the measuring rod, in the case of which the measuring rod is received at least partially in the guide tube and has a rod element and a measuring tongue which is arranged at one end thereof, which is immersible into the lubricant and by which the fill level is to be measured and is visually determinable; and
    at least one seal element which is arranged on the measuring tongue and by which the measuring rod is sealed off from the guide tube.

9. The arrangement according to claim 8, wherein
    a first sub-region of the measuring tongue protrudes out of the guide tube,
    a second sub-region of the measuring tongue, adjoining the first sub-region, is received in the guide tube, and
    the seal element is arranged in the second sub-region.

10. The arrangement according to claim 9, wherein the measuring rod is sealed off from the guide tube exclusively via the seal element.

11. The arrangement according to claim 8, wherein the measuring rod is sealed off from the guide tube exclusively via the seal element.

12. A motor vehicle comprising a measuring rod according to claim 1.

13. A motor vehicle comprising an arrangement according to claim 8.

* * * * *